United States Patent Office 3,658,961
Patented Apr. 25, 1972

3,658,961
PEST CONTROL COMPOSITIONS AND METHOD
Ralph I. Dorfman, Los Altos Hills, Calif., assignor to
Syntex Corporation, Panama, Panama
No Drawing. Continuation-in-part of application Ser. No.
589,856, Oct. 27, 1966. This application May 23, 1969,
Ser. No. 827,134
Int. Cl. A01n 9/24
U.S. Cl. 424—308         7 Claims

ABSTRACT OF THE DISCLOSURE

The control of rodents and birds by administering an edible composition containing a pest management material selected from 1,2,3,4,9,10 - hexahydrophenanthrene; 1,2,3,4,9,10 - hexahydrophenanthrene-acids; 1,2,3,4,9,10-hexahydrophenanthrene alcohols; 1,2,3,4,9,10-hexahydrophenanthrene aldehydes; 1,2,3,4,9,10 - hexadrophenanthrene nitriles; 1,2,3,4,9,10 - hexahydrophenanthrene amides and derivatives thereof to minimize or terminate the reproductive capabilities of said rodents and birds.

This is a continuation-in-part of my copending application Ser. No. 589,856 filed Oct. 27, 1966, now U.S. Pat. 3,476,859.

This invention relates to a novel method and compositions for the control of pests. More particularly, the present invention relates to a novel method for the control of pests which comprises making available to said pests in their habitat an edible composition containing, as the essential active ingredient, a pest management chemical represented by the following formulas:

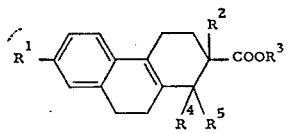

(A)

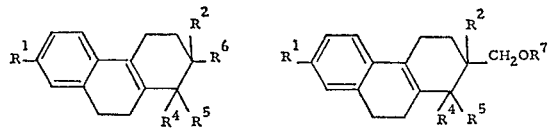

(B)                    (C)

In the above formulas:

$R^1$ is hydrogen, hydroxy, allyloxy, lower dialkylamino lower alkoxy, lower alkyloxy, cycloalkyloxy containing five to six carbon atoms, tetrahydrofuran-2'-yloxy or tetrahydropyran-2'-yloxy;

$R^2$ is hydrogen or lower alkyl;

$R^3$ is hydrogen, lower alkyl, lower alkylaminoalkyl, di-loweralkylaminoalkyl;

$R^4$ is lower alkyl;

$R^5$ is hydrogen or lower alkyl;

$R^6$ is cyano, amido, carbothioalkyl, acetyl, formyl, carbonyl fluoride, carbonyl chloride or lower alkyl;

$R^7$ is hydrogen, lower alkyl, hydrocarbon carboxylic acyl of less than seven carbon atoms, tetrahydrofuran-2'-yl or tetrahydropyran-2'-yl.

The term "pest" as used herein and in the claims is understood to refer to undesirable rodents and birds which are economically and socially destructive to man. More specifically, the term "pest" refers to undesirable rodents such as rats, mice, ground squirrels, prairie dogs, pocket gophers, rabbits, nutria, and the like, and undesirable birds, such as pigeons, crows, starlings, blackbirds, grackles, cowbirds, and the like.

Pests, e.g., rodents and particularly rats are responsible for extensive damage and serious damage to man's well-being. They are known to consume and contaminate food supplies and to destroy grain fields. In addition they are known to carry and transmit diseases, to create social nuisances, and to cause damage to buildings. In the United States alone, it is a well known fact that the annual damage caused by pests results in a loss of hundreds of millions of dollars. It is clear, therefore, that the improvement of the present invention for the control of pests is a welcomed contribution.

Heretofore, several chemical and physical methods have been used in an effort to control pests. The prior are methods generally involve such methods as electrocution, the ingestion of rodenticide baits, and the administration of toxic gases. A primary disadvantage of prior art methods of pests control is that they are effective for only a short period of time. For example, within two to four months after treatment in a particular area by prior art methods, the number of pests within the treated area returns to the level existing before treatment. Such recovery and comeback of pests has been observed to take place even though 95 to 100 percent of the pests had been eliminated. Another disadvantage of prior art methods is the development of "bait shyness" by the pests. Bait shyness is the aversion to bait exhibited by pests after witnessing the death of a few pests who initially test the bait. Another disadvantage of prior art methods is that only those pests which come in direct contact with the bait or mechanical devices are affected.

A primary object of the present invention is to provide a method and a composition for the control of pests which overcome the aforementioned disadvantages. Another object of the present invention is to provide a method and composition for the control of pests which is characterized by ease and simplicity of application but yet is highly effective. Another object of the present invention is to provide a method and composition for control of pests which is not limited in its effectiveness to direct contact. Other objects and advantages of the present invention will become apparent as the invention is hereinafter described in detail and from the claims.

It has now been found in accordance with the present invention that the control of pests, e.g., undesirable rodents and birds, can be simply but yet effectively achieved by making available to said pests in their habitat an edible composition containing, as the essential ingredient, a pest management chemical represented by the above formulas (A), (B) and (C).

The compounds of the above described formulas each possess two center of asymmetry and can exist in two dl forms, e.g., l-cis, d-cis, l-trans and d-trans. In addition, two racemates are possible, e.g., dl-cis and dl-trans. Of the two racemates, the dl-cis racemate is preferred for the process of the invention.

All compounds of the above formulas may be used alone or combined in mixtures thereof for the practice of the present invention.

Representative specific pest control and management chemicals that can be employed according to the present invention include:

racemic 1-ethyl-2-methyl-1,2,3,4,9,10-hexahydro-2-phenanthrenecarboxylic acid;
racemic-cis 1-ethyl-2-methyl-7-methoxy-1,2,3,4,9,10-hexahydro-2-phenanthrenecarboxylic acid methyl ester;

racemic-cis 1-ethyl-2-methyl-7-ethoxy-1,2,3,4,9,10-hexahydro-2-phenanthrenecarboxylic acid;
racemic-cis 1-ethyl-2-methyl-7-methoxy-1,2,3,4,9,10-hexahydro-2-phenanthrenecarboxylic acid ethyl ester;
racemic-cis 1-ethyl-2-methyl-7-methoxy-1,2,3,4,9,10-hexahydro-2-phenanthrenecarboxylic acid n-propyl ester;
racemic-cis 1-ethyl-2-methyl-7-methoxy-1,2,3,4,9,10-hexahydro-2-phenanthrenecarboxylic acid n-butyl ester;
racemic-cis 1-ethyl-2-methyl-7-allyloxy-1,2,3,4,9,10-hexahydro-2-phenanthrenecarboxylic acid;
racemic-cis 1-ethyl-2-methyl-7-n-propoxy-1,2,3,4,9,10-hexahydro-2-phenanthrenecarboxylic acid;
racemic-cis 1-ethyl-2-methyl-7-n-butoxy-1,2,3,4,9,10-hexahydro-2-phenanthrenecarboxylic acid methyl ester;
racemic-cis 1-ethyl-2-methyl-7-methoxy-1,2,3,4,9,10-hexahydro-2-[carbo(diethylamino)ethoxy]-phenanthrene;
racemic-cis 1-ethyl-2-methyl-7-(diethylaminoethoxy)-1,2,3,4,9,10-hexahydro-2-[carbo(diethylamino)ethoxy]-phenanthrene;
racemic-cis 1,2-dimethyl-7-hydroxy-1,2,3,4,9,10-hexahydro-2-phenanthrenecarboxylic acid;
racemic-cis 1,2-diethyl-7-hydroxy-1,2,3,4,9,10-hexahydro-2-phenanthrenecarboxylic acid;
racemic-cis 1-ethyl-2-n-propyl-7-hydroxy-1,2,3,4,9,10-hexahydro-2-phenanthrenecarboxylic acid;
racemic-cis 7-hydroxy-1,2,3,4,9,10-hexahydro-2-phenanthrenecarboxylic acid;
racemic-cis 1-methyl-7-hydroxy-1,2,3,4,9,10-hexahydro-2-phenanthrenecarboxylic acid;
racemic-cis 1-methyl-7-methoxy-1,2,3,4,9,10-hexahydro-2-phenanthrenecarboxylic acid;
racemic-cis 1,2-dimethyl-1-ethyl-7-methoxy-1,2,3,4,9,10-hexahydro-2-phenanthrenecarboxylic acid;
racemic-cis 1,1-diethyl-2-methyl-7-methoxy-1,2,3,4,9,10-hexahydro-2-phenanthrenecarboxylic acid;
racemic-cis 1-ethyl-2-methyl-2-cyano-7-methoxy-1,2,3,4,9,10-hexahydro-2-phenanthrenecarboxylic acid;
racemic-cis 1-ethyl-2-methyl-2-cyano-7-methoxy-1,2,3,4,9,10-hexahydrophenanthrene;
racemic-cis 1-ethyl-2-methyl-2-amido-7-methoxy-1,2,3,4,9,10-hexahydrophenanthrene;
racemic-cis 1-ethyl-2-methyl-2-carbothiomethyl-7-methoxy-1,2,3,4,9,10-hexahydrophenanthrene;
racemic-cis 1-ethyl-2-methyl-2-acetyl-7-methoxy-1,2,3,4,9,10-hexahydrophenanthrene;
racemic-cis 1-ethyl-2-methyl-2-formyl-7-methoxy-1,2,3,4,9,10-hexahydrophenanthrene;
racemic-cis 1-ethyl-2-methyl-2-acetoxymethyl-7-methoxy-1,2,3,4,9,10-hexahydrophenanthrene;
racemic-trans 1-ethyl-2-methyl-2-methylol-7-methoxy-1,2,3,4,9,10-hexahydrophenanthrene;
racemic-trans 1-ethyl-2-methyl-2-acetoxymethyl-7-methoxy-1,2,3,4,9,10-hexahydrophenanthrene;
racemic-cis 1-ethyl-2-methyl-2-carbothioethyl-7-methoxy-1,2,3,4,9,10-hexahydrophenanthrene;
racemic-cis 1-ethyl-2,2-dimethyl-7-methoxy-1,2,3,4,9,10-hexahydrophenanthrene;
racemic-cis 1,2-diethyl-2-methyl-7-methoxy-1,2,3,4,9,10-hexahydrophenanthrene;
1-methyl-7-methoxy-1,2,3,4,9,10-hexahydro-2-phenanthrenecarboxylic acid;
racemic-cis 1,2-dimethyl-7-methoxy-1,2,3,4,9,10-hexahydro-2-phenanthrenecarboxylic acid;
racemic-trans 1,2-dimethyl-7-methoxy-1,2,3,4,9,10-hexahydro-2-phenanthrenecarboxylic acid;
racemic-cis 1-ethyl-2-methyl-7-methoxy-1,2,3,4,9,10-hexahydro-2-phenanthrenecarboxylic acid;
racemic-trans 1-ethyl-2-methyl-7-methoxy-1,2,3,4,9,10-hexahydro-2-phenanthrenecarboxylic acid;
1-ethyl-2-methyl-2-formyl-7-methoxy-1,2,3,4,9,10-hexahydrophenanthrene;
1-ethyl-2-methyl-2-methylol-7-methoxy-1,2,3,4,9,10-hexahydrophenanthrene;
1-ethyl-2-methyl-2-methylol-7-hydroxy-1,2,3,4,9,10-hexahydrophenanthrene;
racemic-cis 1-ethyl-2-methyl-7-n-butoxy-1,2,3,4,9,10-hexahydro-2-phenanthrenecarboxylic acid;
racemic-cis 1,2-dimethyl-1-ethyl-7-methoxy-1,2,3,4,9,10-hexahydro-2-phenanthrenecarboxylic acid fluoride;
dl-cis 1-ethyl-2-methyl-7-methoxy-1,2,3,4,9,10-hexahydro-2-phenanthrenecarboxylic acid fluoride;
dl-trans 1-ethyl-2-methyl-7-methoxy-1,2,3,4,9,10-hexahydro-2-phenanthrenecarboxylic acid fluoride;
racemic-cis 1-ethyl-2-methyl-7-methoxy-1,2,3,4,9,10-hexahydro-2-phenanthrenecarboxylic acid fluoride, and the like.

The preparation of the cyclopentyloxy, tetrahydrofuran-2'-yloxy and tetrahydropyran-2'-yloxy derivatives is described in copending U.S. application of John A. Edwards, Ser. No. 589,494 filed Oct. 26, 1966.

The pest management chemicals of the above formulas for pest control possess a high anti-fertility activity with low estrogenicity. Specifically, the pest management chemicals of the present invention exhibit a high ratio of anti-fertility activity with respect to estrogenic activity and possess an activity quotient from about 2 to more than 100.

The determination of the oral anti-fertility activity is obtained from the bio-assay procedure as described by F. A. Kincl and R. I. Dorfman, J. Reprod. Fertil., 10, 105–113 (1965). In this test, adult female rats in the proestrus stage of the cycle are selected and caged with male rats for forty-eight hours. The test material is administered orally by gavage daily in an aqueous vehicle for seven days beginnng on the day of proestrus (day 1). Vaginal smears are taken on days 2 and 3, unless insemination is confirmed after the first day. At autopsy on the ninth day of the test (two days after the last day of treatment) the number of implant sites is determined.

The oral estrogenic activity is obtained from the bioassay procedure as described by B. L. Rubin, A. S. Dorfman, L. Black and R. I. Dorfman, Endocrinology, 49, 429 (1951) [R. I. Dorfman and A. S. Dorfman, Endocrinology, 55, 65 (1954); F. A. Kincl and R. I. Dorfman, Acta Endocrinologica, 52, 619–626 (1966)]. In this test, intact female rats 21–22 days of age or intact female mice 19–20 days of age are administered the test material daily in 0.2 ml. sesame/oil gavage dose for three days. At autopsy on the day after the last treatment the uterus is removed, the fluid pressed from it and weighed.

The ratio of the anti-fertility action to the estrogenic action upon oral administration in the rat is indicated in Table I as the activity quotient. Oral hormonal activity of the pest management and control chemicals of the present invention are determined in terms of mestranol as the standard, which has an activity quotient of one.

TABLE I

| Substance | Oral anti-fertility activity | Oral estrogenic activity | Activity quotient |
| --- | --- | --- | --- |
| Mestranol | 1 | 1 | 1 |
| 1-ethyl-2-methyl-7-methoxy-1,2,3,4,9, 10-hexahydrophenanthrene-2-carboxylic acid methyl ester | 8 | 4.4 | 1.8 |
| 1-ethyl-2-methyl-7-methoxy-1,2,3,4,9, 10-hexahydrophenanthrene-2-carboxylic acid | 32 | 2.2 | 15.0 |
| 1-ethyl-2-methyl-2-methylol-7-methoxy-1,2,3,4,9,10-hexahydropehnanthrene | 7 | 2 | 3.5 |

The values show that the compounds of the present invention exhibit superior properties in that the activity quotient is about two to fifteen times that of mesranol and three and one-half to thirty times that of estradiol which has an acivity quotient of 0.5.

In addition to the tests carried out in Table I, further standard tests were carried out in the mouse according to Kincl and Dorfman, ibid, and provide another basis upon which the compounds of the present invention show marked superiority. The results based upon estrogenic activity in the mouse are indicated in the following table.

TABLE II

| Substance | Oral anti-fertility activity | Oral estrogenic activity | Activity quotient |
|---|---|---|---|
| Mestranol | 1 | 1 | 1 |
| 1-ethyl-2-methyl-7-methoxy-1,2,3,4,9,10-hexahydrophenanthrene-2-carboxylic acid methyl ester | 8 | 0.1 | 80 |
| 1-ethyl-2-methyl-7-methoxy-1,2,3,4,9,10-hexahydrophenanthrene-2-carboxylic acid | 32 | 0.3 | 107 |
| 1-ethyl-2-methyl-2-methylol-7-methoxy-1,2,3,4,9,10-hexahydrophenanthrene | 7 | 0.08 | 90 |

In this instance, the results show that the compounds of the invention have an activity quotient far surpassing that of mestranol and estradiol.

The compounds of the present invention are extremely effective for the control and management of pests due to their marked increased activity as anti-fertility agents surpassing their estrogenic activity.

In practicing the present invention for an improved method of pest control, the pest management chemical is incorporated into a food complement with or without baits. The pest management chemical can, for example, be incorporated into a food complement and/or bait by any convenient manner, as for instance, by simply mixing in the case of solid materials and by dissolution or suspension in the case of liquid materials. Thus, for example, the pest control and management chemical is admixed in corn, oats, rye, wheat, bran or grass, legumes, milk, meat, fish or other nutrients, as well as mixtures thereof, or together with conventional baits, e.g. sugar, molasses, corn oil, peanut oil, peanut butter, bacon, lard, mutton, tallow, and the like, as well as mixtures thereof.

The amount of the pest management chemical, employed in the novel edible compositions of the present invention, can vary considerably. In order to control or regulate the amount of the edible composition that will be consumed by each member of a pest population at a given time, it is preferred to use as large an amount of the pest management chemical in the composition as possible without causing the composition to be objectionable to the pest. This amount, i.e. the highest concentration, will vary with the particular pest being treated and with the type of bait being used. Ordinarily, the amount of the pest management chemical varies from about 0.0001 to about 0.5 percent by weight of the novel edible composition. However, amounts above or below this range can be used, if desired, depending on such factors as the type of pest being treated. The most suitable novel edible composition will vary according to the type of pest to be treated and the conditions existing in the area occupied by the pests. One method of selecting the most advantageous food complement and bait for a particular pest and area is to set out, e.g. in food stations, several food complements, baits and combinations thereof, known to be normally consumed by the specific pest, and observe which is most readily consumed. While establishing which is preferred by the pests, it is also advantageous for optimum treatment to note the approximate daily consumption of the preferred food complement, bait or combination. In this manner, the most preferred combination and the approximate daily consumption for the pests in a particular area can be easily and reliably determined to achieve the optimum effect of the treatment. In general, it is preferable to make available to the pests that amount of the preferred combination plus the essential active ingredient, i.e. the pest management chemical, which can be expected to be consumed in one or two days. The novel compositions containing the preferred combinations of food and bait for a specific pest are then supplied, e.g. in one or several feed stations, to the burrows and habitats of the pests and are subsequently consumed by the pests in their routine feeding activities. This established amount of the novel edible composition of the present invention is then provided for a short or extended length of time of from several days to several months, depending on the specific pest and the desired extent of control in each situation. The effect of the composition on the pests will differ according to the various members of the particular pest population consuming the pest management chemical composition. Consumption of the edible composition of the present invention by the pests arrests the sexual viability of the present generation and either prevents or seriously impairs the procreation of future generations. All members of the population are effected by these chemicals, both adults and young, both males and females. In the case of adult females, an overall effect on fertility, such as prevention of ovulation and transport of the zygotes in the oviducts, leads to a decrease in the littering of newborn pests. In addition, a majority of females, whether pregnant or not, showed no visible mammae and mammary nipples which seriously impairs the development of the young. In the case of pregnant females, pregnancy is interrupted at all stages of gestation leading to interuterine death and resorption of the fetus. In addition, abortions are also a common occurrence. In the case of adult males, the libido of the pest is decreased due to the morphological changes caused by the pest management chemical. For example, in a rat population, ninety percent of the adult males showed reproductive organs smaller than normal after consumption of the edible composition. In a similar observation, the testes in a majority of the adult male rats were considerably smaller than normal and that one or both were in the abdominal rather than the scrotal position. In the case of newborn or young, the consumption of the pest management chemical impairs the normal sexual development of the pest and in some cases even causes these members to become permanently sterile. In addition, consumption of the edible compositions of the present invention causes the thus-treated pests to become more aggressive and to compete more vigorously with the untreated pests for the available food supply and to vigorously defend their territory against other pests, thereby diminishing the supply of food available to untreated pests.

The following examples serve to illustrate but are not necessarily intended to limit the scope of the present invention.

PREPARATION A

A solution of 1 g. of dl-cis 1-ethyl-2-methyl-7-methoxy-1,2,3,4,9,10-hexahydro - 2 - phenanthrenecarboxylic acid in 30 ml. of anhydrous methylene chloride is allowed to react with 1 g. of N-(2-chloro-1,1,2-trifluoroethyl)-diethylamine. The reaction mixture is heated under reflux for a period of five hours. The mixture is then poured into ice water, and the product extracted with ether. The extracts are dried and evaporated to dryness to yield the dl-cis 1-ethyl-2-methyl-7-methoxy-1,2,3,4,9,10-hexahydro-2-phenanthrenecarboxylic acid fluoride which is recrystallized from acetone:hexane.

In a similar manner, utilizing the above procedure dl-cis 1-ethyl-2-methyl-7-n-butoxy-1,2,3,4,9,10-hexahydro-2-phenanthrenecarboxylic acid;

dl-cis 1,2-dimethyl-1-ethyl-7-methoxy-1,2,3,4,9,10-hexahydro-2-phenanthrenecarboxylic acid; and dl-trans 1-ethyl-2-methyl-7-methoxy-1,2,3,4,9,10-hexahydro-2-phenanthrenecarboxylic acid;

are converted to the corresponding acid fluorides, namely dl-cis 1-ethyl-2-methyl-7-n-butoxy-1,2,3,4,9,10-hexahydro-2-phenanthrenecarboxylic acid fluoride;

dl-cis 1,2-dimethyl-1-ethyl-7-methoxy-1,2,3,4,9,10-hexahydro-2-phenanthrenecarboxylic acid fluoride; and
dl-trans 1-ethyl-2-methyl-7-methoxy-1,2,3,4,9,10-hexahydro-2-phenanthrenecarboxylic acid fluoride.

Example 1

A mixture of 100 g. of flour is blended with 0.01 g. of 1-ethyl-2-methyl - 7 - methoxy - 1,2,3,4,9,10-hexahydro-2-phenanthrenecarboxylic acid in a dry blender for a period of two hours to afford a composition containing 0.01 weight percent of active material.

In a similar manner, two mixtures each containing 0.01 g. of 1-ethyl-2-methyl-7-methoxy-1,2,3,4,9,10-hexahydro-2-phenanthrenecarboxylic acid fluoride and 1-ethyl-2-methyl - 7 - methoxy-1,2,3,4,9,10-hexahydrophenanthryl-2-methanol, are prepared.

Example 2

A mixture of 85 g. of cornmeal, and 15 g. of paraffin oil is blended with 0.01 g. of 1-ethyl-2-methyl-7-methoxy-1,2,3,4,9,10-hexahydrophenanthrenecarboxylic acid in a dry blender for a period of two hours to afford a composition containing 0.01 weight percent of the active material in combination with a bait.

In a similar manner, three mixtures containing the same portions of cornmeal, 1-ethyl-2-methyl-7-methoxy-1,2,3,4,9,10 - hexahydrophenanthrenecarboxylic acid and first linseed oil, second corn oil, and third sugar are blended in a dry blender for a period of two hours to afford compositions containing 0.01 weight percent of active material.

Example 3

A composition containing 0.01 weight percent of 1-ethyl-2-methyl-7-methoxy-1,2,3,4,9,10-hexahydro - 2 - phenanthrenecarboxylic acid in a 50/50 mixture of chicken mash and canned salmon was made available to a population of 100–125 rats, all rattus Norvegicus, for a period of 100 days.

Six pounds of this composition were placed into 25 separate food stations every second day for the 100 day period. Three months later, visual observation and morphological observation of the treated population were compared with those of an untreated population of an equal size. From the visual observation of the treated area, it can be seen that:

(1) there is complete absence of young rats in the treated area in contrast to untreated area which abounds with young,
(2) the percent of pregnant rats from the treated area is considerably smaller than from the untreated rats,
(3) there are no signs of recovery of population or of a comeback of rats, and
(4) the treated rats are considerably more aggressive than the untreated rats.

From the morphological observation of 25 female and 25 male rats from the treated area, it can be seen that:

(1) testes in majority of males are one or both in abdominal rather than in scrotal position,
(2) of the adult males, 90 percent showed reproductive organs which are smaller than normal,
(3) the majority of females, whether they were pregnant or not, showed no visible mammae and mammary nipples,
(4) in a few cases only unilateral pregnancy was observed in one horn. Opposite ovary is much larger in those cases. In some cases number of fetuses in one horn is not in normally expected proportion with the other horn,
(5) in a few cases, embryos in one horn are much larger than in the other one.

Example 4

The procedure of Example 2 was repeated in every detail except that the hydrophenanthrene compound was replaced by 1-ethyl-2-methyl-7-methoxy-1,2,3,4,9,10-hexahydrophenanthrene-2-carboxylic acid methyl ester.

What is claimed is:

1. A method for controlling and managing pests selected from the group consisting of rodents and birds which comprises making available to said pests in their habitat an edible composition containing as the essential ingredient a managing amount of a pest management chemical represented by the following formulas:

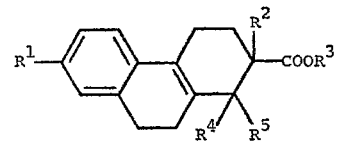

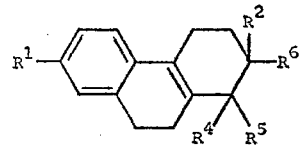

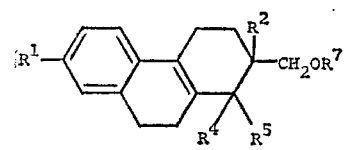

wherein
$R^1$ is hydrogen, hydroxy, allyloxy, lower dialkylamino lower alkoxy, lower alkoxy, cycloalkyloxy containing five to six carbon atoms, tetrahydrofuran-2'-yloxy or tetrahydropyran-2'-yloxy;
$R^2$ is hydrogen or lower alkyl;
$R^3$ is hydrogen, lower alkyl, lower alkylaminoalkyl, diloweralkylaminoalkyl;
$R^4$ is lower alkyl;
$R^5$ is hydrogen or lower alkyl;
$R^6$ is cyano, amido, carbothiomethyl, carbothioethyl, acetyl, formyl, carbonyl, carbonyl fluoride, carbonyl chloride or lower alkyl;
$R^7$ is hydrogen, lower alkyl, hydrocarbon carboxylic acyl of from two to less than seven carbon atoms, tetrahydrofuran-2'-yl or tetrahydropyran-2'-yl, and a food complement, bait or a mixture of a food complement and a bait.

2. The method according to claim 1 wherein said composition contains from 0.001 to 0.5 weight percent of said pest management chemical.

3. The method according to claim 1 wherein the pest management chemical is represented by the following formula:

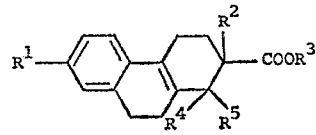

wherein $R^1$ is methoxy; $R^2$ is methyl; $R^3$ is hydrogen; $R^4$ is ethyl; and $R^5$ is hydrogen.

4. The method according to claim 1 wherein the pest management chemical is represented by the following formula:

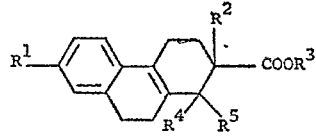

wherein $R_1$ is methoxy; $R^2$ is methyl; $R^3$ is methyl; $R^4$ is ethyl; and $R^5$ is hydrogen.

5. The method according to claim 1 wherein said pest is a rat.

6. The method according to claim 1 wherein the pest management chemical is represented by the following formula:

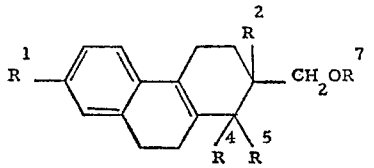

wherein $R^1$ is methoxy; $R^2$ is methyl; $R^4$ is ethyl; $R^5$ is hydrogen and $R^7$ is hydrogen.

7. The method according to claim 1 wherein the pest management chemical is represented by the following formula:

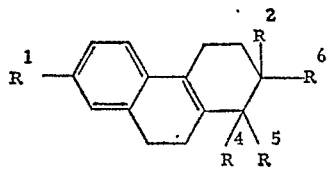

wherein $R^1$ is methoxy; $R^2$ is methyl; $R^4$ is ethyl; $R^5$ is hydrogen and $R^6$ is carbonyl fluoride.

References Cited

UNITED STATES PATENTS 2,621,210  12/1952  Miescher et al. _____ 260—468.5

OTHER REFERENCES

Cameron et al., "Chem. Abstracts," vol. 40, pp. 7353[9]–7354[3].

ALBERT T. MEYERS, Primary Examiner

V. D. TURNER, Assistant Examiner

U.S. Cl. X.R.

424—283, 285, 301, 304, 317, 324, 330, 333, 339, 343